(12) United States Patent
Yang et al.

(10) Patent No.: US 12,108,284 B2
(45) Date of Patent: Oct. 1, 2024

(54) ENHANCED PFCP ASSOCIATION PROCEDURE FOR SESSION RESTORATION

(71) Applicant: Telefonaktiebolaget LM Ericsson (publ), Stockholm (SE)

(72) Inventors: Yong Yang, Kållered (SE); Jinyin Zhu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 17/765,563

(22) PCT Filed: Oct. 2, 2020

(86) PCT No.: PCT/EP2020/077725
§ 371 (c)(1),
(2) Date: Mar. 31, 2022

(87) PCT Pub. No.: WO2021/064211
PCT Pub. Date: Apr. 8, 2021

(65) Prior Publication Data
US 2022/0400410 A1    Dec. 15, 2022

(30) Foreign Application Priority Data

Oct. 3, 2019  (WO) ................ PCT/CN2019/109817

(51) Int. Cl.
*H04W 28/12*    (2009.01)
*H04L 41/0654*  (2022.01)

(52) U.S. Cl.
CPC ......... *H04W 28/12* (2013.01); *H04L 41/0654* (2013.01)

(58) Field of Classification Search
None
See application file for complete search history.

(56) References Cited

U.S. PATENT DOCUMENTS 10,448,268  B1 *  10/2019  Jaya .................... H04W 76/19
2017/0310763  A1   10/2017  Morgan
(Continued)

FOREIGN PATENT DOCUMENTS

WO    2019154037 A1    8/2019
WO    2019162378 A1    8/2019

OTHER PUBLICATIONS

Author Unknown, "Technical Specification Group Core Network and Terminals; Restoration procedures (Release 15)," Technical Specification 23.007, Version 15.4.0, Sep. 2019, 3GPP Organizational Partners, 107 pages.
(Continued)

*Primary Examiner* — Lonnie V Sweet
(74) *Attorney, Agent, or Firm* — Withrow & Terranova, PLLC

(57) ABSTRACT

Systems and methods are disclosed for providing an enhanced Packet Forwarding Control Protocol (PFCP) association procedure for session restoration. In this regard, a method performed by a PFCP node comprises deleting one or more PFCP sessions of the PFCP node that are associated with a failed PFCP entity or with a failed PFCP path. The method further comprises sending, to a PFCP peer node, a node level message to request that the PFCP peer node delete a corresponding one or more PFCP sessions of the PFCP peer node that are associated with the failed PFCP entity or with the failed PFCP path, wherein the node level message comprises an indication of the corresponding one or more PFCP sessions. Some embodiments provide that the node level message comprises a PFCP Association Setup Request including sessions retention information to indicate whether to retain PFCP sessions associated with the PFCP Association Setup Request.

14 Claims, 7 Drawing Sheets

(56) References Cited

U.S. PATENT DOCUMENTS

| | | | |
|---|---|---|---|
| 2020/0053828 A1* | 2/2020 | Bharatia | H04W 76/11 |
| 2020/0245163 A1* | 7/2020 | Jaya | H04L 47/2475 |
| 2021/0076292 A1* | 3/2021 | Pignataro | H04W 40/12 |
| 2021/0289566 A1* | 9/2021 | Jimenez Cordon | H04L 63/1458 |
| 2022/0294855 A1* | 9/2022 | Landais | H04L 67/142 |

OTHER PUBLICATIONS

Author Unknown, "Technical Specification Group Services and System Aspects; Procedures for the 5G System; Stage 2 (Release 15)," Technical Specification 23.502, Version 15.4.0, Dec. 2018, 3GPP Organizational Partners, 346 pages.

Author Unknown, "Technical Specification Group Core Network and Terminals; 5G System; Restoration Procedures (Release 16)," Technical Specification 23.527, Version 16.1.0, Sep. 2019, 3GPP Organizational Partners, 19 pages.

Author Unknown, "Technical Specification Group Core Network and Terminals; Interface between the Control Plane and the User Plane Nodes; Stage 3 (Release 16)," Technical Specification 29.244, Version 16.1.0, Sep. 2019, 3GPP Organizational Partners, 243 pages.

Author Unknown, "Technical Specification Group Core Network and Terminals; 3GPP Evolved Packet System (EPS); Evolved General Packet Radio Service (GPRS) Tunneling Protocol for Control plane (GTPv2-C); Stage 3 (Release 15)," Technical Specification 29.274, Version 15.4.0, Jun. 2018, 3GPP Organizational Partners, 386 pages.

Ericsson, et al., "C4-190337: Up function requested PFCP Association Release," 3GPP TSG-CT WG4 Meeting #89, Feb. 25-Mar. 1, 2019, Montreal, Canada, 16 pages.

International Search Report and Written Opinion for International Patent Application No. PCT/EP2020/077725, mailed Feb. 5, 2021, 16 pages.

Examination Report for Indian Patent Application No. 202247024900, mailed Sep. 7, 2022, 7 pages.

Nokia, et al., "C4-195059: PFCP Association Setup Request with same Node ID," 3GPP TSG-CT WG4 Meeting #95, Nov. 11-15, 2019, Reno, Nevada, 14 pages.

Examination Report for European Patent Application No. 20789886.7, mailed Mar. 9, 2023, 12 pages.

* cited by examiner

ENHANCED PFCP ASSOCIATION PROCEDURE FOR SESSION RESTORATION

This application is a 35 U.S.C. § 371 national phase filing of International Application No. PCT/EP2020/077725, filed Oct. 2, 2020, which claims the benefit of International Application No. PCT/CN2019/109817, filed Oct. 3, 2019, the disclosures of which are incorporated herein by reference in their entireties.

TECHNICAL FIELD

The present disclosure relates to Packet Forwarding Control Protocol (PFCP) session management in a cellular communications network.

BACKGROUND

The Third Generation Partnership Project (3GPP) Technical Specification (TS) 29.244, version 16.1.0 defines the Packet Forwarding Control Protocol (PFCP) used on an interface between a control plane (CP) function and a user plane (UP) function in a cellular communications network. In particular, 3GPP TS 29.244 specifies that, for a PFCP node represented by a Node ID, there can exist multiple PFCP entities that are each represented by respective different Internet Protocol (IP) addresses. Additionally, a heartbeat procedure is performed to monitor path status between each CP PFCP entity and a corresponding UP PFCP entity. 3GPP TS 29.244 also defines functionality enabling PFCP sessions that are successively controlled by different Session Management Functions (SMFs) of an SMF set, and defines two features in support of this functionality. The first feature, SMF Set (SSET), enables one PFCP association to be set up per SMF set, while the second feature, Multiple PFCP Associations to the SMFs in an SMF set (MPAS), enables one PFCP association to be set up per SMF instance. 3GPP TS 23.007, version 15.4.0 further provides that, when a PFCP entity detects a path failure of a path between the PFCP entity and a peer entity, the PFCP sessions associated with the failed path can be deleted.

However, conventional PFCP session management may encounter a number of issues. For example, when a PFCP entity fails without restart, the PFCP sessions associated with that PFCP entity may be immediately lost. However, a peer entity of the PFCP entity cannot detect the failure of the PFCP entity until the failure of the path between the PFCP entity and the peer entity is detected. This may result in a mismatch in session status between, e.g., a CP PFCP entity and a UP PFCP entity for a period of time. During this period, if a new PFCP session is to be established and a resource (e.g., a user equipment (UE) IP address or user plane Fully Qualified Tunnel Endpoint Identifier (F-TEID)) used by the original PFCP session associated with the failed PFCP entity is reused by another PFCP entity in the same PFCP node as the failed PFCP entity, unpredictable problems may result. In the case of a PFCP path failure, at the time a PFCP entity deletes PFCP sessions associated with a PFCP path upon detection of the PFCP path failure, a peer entity of the PFCP entity may not detect the path failure. This may give rise to the PFCP session status mismatch issue referenced above.

Moreover, when a CP function initiates a new PFCP association setup procedure when dealing with SMF sets (e.g., using MPAS), a corresponding UP function may not be able to determine whether the PFCP sessions belonging to this association should be deleted or not. This is because the PFCP association setup may be triggered by failure of one SMF instance failure, while the PFCP sessions may be kept or may be triggered due to failure of the whole SMF set, resulting in loss of all of the PFCP sessions belonging to the SMF set.

SUMMARY

Systems and methods are disclosed herein for providing an enhanced PFCP association procedure for session restoration. Embodiments of a method by a Packet Forwarding Control Protocol (PFCP) node for providing an enhanced PFCP association procedure for session restoration are disclosed. In some embodiments, the method comprises deleting one or more PFCP sessions of the PFCP node that are associated with a failed PFCP entity or with a failed PFCP path. The method further comprises sending, to a PFCP peer node, a node level message to request that the PFCP peer node delete a corresponding one or more PFCP sessions of the PFCP peer node that are associated with the failed PFCP entity or with the failed PFCP path, wherein the node level message comprises an indication of the corresponding one or more PFCP sessions.

In some embodiments, the method further comprises, prior to deleting the one or more PFCP sessions, sending, to the PFCP peer node, a PFCP Association Setup Request to initiate a PFCP association setup procedure. In some embodiments, the PFCP node comprises a control plane (CP) function, and the PFCP peer node comprises a user plane (UP) function. In some embodiments, the PFCP node comprises a UP function, and the PFCP peer node comprises a CP function.

In some embodiments in which the PFCP node comprises a CP function, the PFCP peer node comprises a UP function, and the node level message comprises a PFCP Association Setup Request, the PFCP Association Setup Request comprises sessions retention information to indicate whether PFCP sessions associated with the PFCP Association Setup Request should be retained. The method further comprises receiving, by the PFCP node from the PFCP peer node, a PFCP Association Setup Response comprising a sessions retention indication to indicate that the PFCP sessions associated with the PFCP Association Setup Request are successfully retained.

In some embodiments, the sessions retention information indicates that all of the PFCP sessions associated with the PFCP Association Setup Request should be retained. In some embodiments, the sessions retention information comprises a list of IP addresses corresponding to a subset of the PFCP entities to be retained. In some embodiments, the indication of the corresponding one or more PFCP session comprises a "PFCP Sessions to be deleted information" element.

In some embodiments, the node level message comprises one of a PFCP Association Update Request, a PFCP Session Set Deletion Request, or a custom message. In some embodiments, the method further comprises receiving, by the PFCP node from the PFCP peer node, a response message confirming deletion of the corresponding one or more PFCP sessions of the PFCP peer node.

Embodiments of a method performed by a PFCP node comprising a CP function for providing PFCP sessions retention information are disclosed. In some embodiments, the method comprises sending, to a PFCP peer node comprising a UP function, a PFCP Association Setup Request to initiate a PFCP association setup procedure, wherein the PFCP Association Setup Request comprises sessions retention information to indicate whether PFCP sessions associated with the PFCP Association Setup Request should be retained. The method further comprises receiving, by the PFCP node from the PFCP peer node, a PFCP Association Setup Response comprising a sessions retention indication to indicate that the PFCP sessions associated with the PFCP Association Setup Request are successfully retained.

In some embodiments, the sessions retention information indicates that all of the PFCP sessions associated with the PFCP Association Setup Request should be retained. In some embodiments, the sessions retention information comprises a list of IP addresses corresponding to a subset of the PFCP entities to be retained.

Embodiments of a core network entity are also disclosed. In some embodiments, the core network entity is configured to perform any of the steps of any of the above-disclosed methods.

Embodiments of a core network entity are also disclosed. In some embodiments, the core network entity is adapted to perform any of the steps of any of the above-disclosed methods.

Embodiments of a network node for implementing a core network entity are also disclosed. In some embodiments, the network node comprises a network interface, and processing circuitry associated with the network interface, the processing circuitry configured to cause the network node to implement the core network entity, wherein the core network entity is configured to perform any of the steps of any of the above-disclosed methods.

Embodiments of a network node for implementing a core network entity are also disclosed. In some embodiments, the network node comprises a network interface, and processing circuitry associated with the network interface, the processing circuitry adapted to cause the network node to implement the core network entity, wherein the core network entity is adapted to perform any of the steps of any of the above-disclosed methods.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
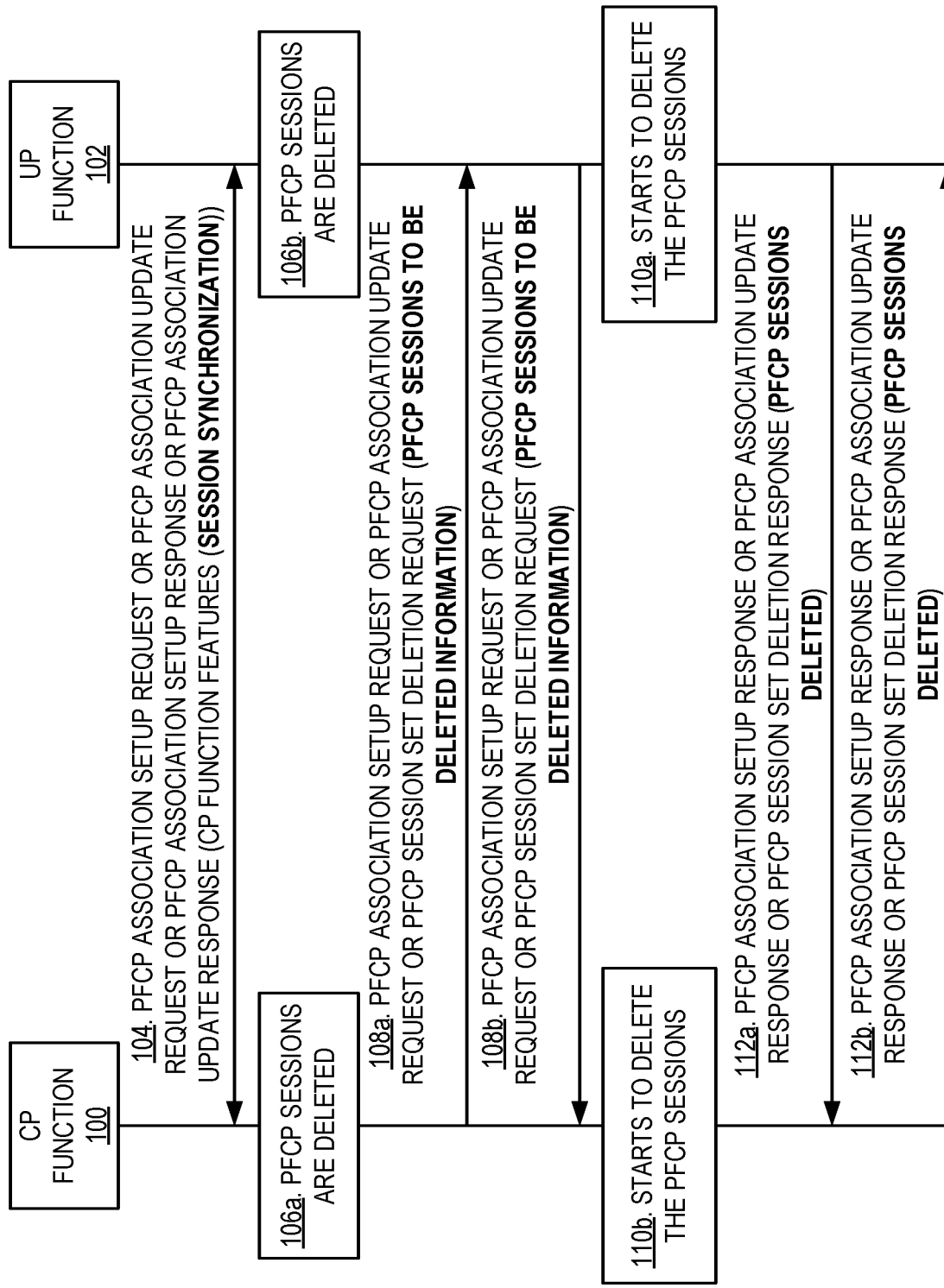
FIG. 1 illustrates signaling flows between Packet Forwarding Control Protocol (PFCP) nodes (e.g., a control plane (CP) function and a user plane (UP) function) for providing an enhanced PFCP association procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with existing solutions. In particular, failure of a Packet Forwarding Control Protocol (PFCP) entity without restart results in immediate loss of the PFCP sessions associated with that PFCP entity, but a peer entity of the PFCP entity cannot detect the failure of the PFCP entity until the failure of the path between the PFCP entity and the peer entity is detected. This may result in a mismatch in session status between, e.g., a control plane (CP) PFCP entity and a user plane (UP) PFCP entity for a period of time, during which reuse of a resource used by the original PFCP session associated with the failed PFCP entity by another PFCP entity in the same PFCP node as the failed PFCP entity may result in unpredictable problems. Moreover, when a CP function initiates a new PFCP association setup procedure when dealing with Session Management Function (SMF) sets (e.g., using MPAS), a corresponding UP function may not be able to determine whether the PFCP sessions belonging to this association should be deleted or not. This is because the PFCP association setup may be triggered by failure of one SMF instance failure, while the PFCP sessions may be kept or may be triggered due to failure of the whole SMF set, resulting in loss of all of the PFCP sessions belonging to the SMF set.

FIG. 1

Certain aspects of the present disclosure and their embodiments may provide solutions to the aforementioned or other challenges. In this regard, FIG. 1 illustrates signaling flows between PFCP nodes for providing an enhanced PFCP association procedure. The PFCP nodes in FIG. 1 are a CP function 100 and a UP function 102. It is to be understood that the CP function 100 may be considered a "PFCP node" and the UP function 102 may be considered a "PFCP peer node," or vice versa. It is to be further understood that some steps illustrated in FIG. 1 may be omitted depending on whether the CP function 100 is considered a "PFCP node" and the UP function 102 is considered a "PFCP peer node," or vice versa. For example, if the CP function 100 is considered a "PFCP node" and the UP function 102 is considered a "PFCP peer node," then steps 106b, 108b, 110b, and 112b may be omitted. Conversely, if the UP function 102 is considered a "PFCP node" and the CP function 100 is considered a "PFCP peer node," then steps 106a, 108a, 110a, and 112a may be omitted.

At step 104, the CP function 100 and the UP function 102 negotiate support of the features of session synchronization, using PFCP Association Setup messages or PFCP Association Update messages. The PFCP sessions are then deleted in the PFCP node (i.e., the CP function 100 at step 106a or the UP function 102 at step 106b), which is caused by, e.g., a PFCP entity failure or a detection of PFCP path failure towards a peer PFCP entity.

At steps 108a and 108b, the CP function 100 or the UP function 102 sends a node level message to notify the PFCP peer node to delete the corresponding PFCP sessions. In some embodiments, the node level message may be a PFCP Association Setup Request message, a PFCP Association Update Request message, a PFCP Session Set Deletion Request message, or a custom message. In the node level message, the CP function 100 or the UP function 102 includes an information element that comprises an indication of the PFCP sessions to be deleted.

The receiving UP function 102 or the receiving CP function 100 starts to delete the PFCP sessions at steps 110a and 110b. In some embodiments, the receiving UP function 102 or the receiving CP function 100 sends a response message to the sending CP function 100 or UP function 102 confirming the deletion of the PFCP sessions. In the message, the UP function 102 or CP function 100 includes a "PFCP Sessions deleted" indication.

The information elements that constitute a PFCP Session Set Deletion Request and a PFCP Association Update Request according to some embodiments are shown below in Tables 1 and 2, respectively.

TABLE 1

Information Elements in a PFCP Session Set Deletion Request

| Information elements | P | Condition/Comment | Appl. Sx a | Sx b | Sx c | N4 | IE Type |
|---|---|---|---|---|---|---|---|
| Node ID | M | This IE shall contain the node identity of the originating node of the message. | X | X | — | | Node ID |
| PFCP Sessions to be deleted information | C | In case of entity failure, this IE includes the IP address of the failed entity; in case of path failure, this IE includes the source IP address and destination IP address of a path between two peer entities. | X | X | | X | PFCP Sessions to be deleted information |

TABLE 2

Information Elements in a PFCP Association Update Request

| Information elements | P | Condition/Comment | IE Type |
|---|---|---|---|
| PFCP Sessions to be deleted information | O | In case of entity failure, this IE includes the IP address of the failed entity; in case of path failure, this IE includes the source IP address and destination IP address of a path between two peer entities. | PFCP Sessions to be deleted information |

FIG. 2

Figure 2:
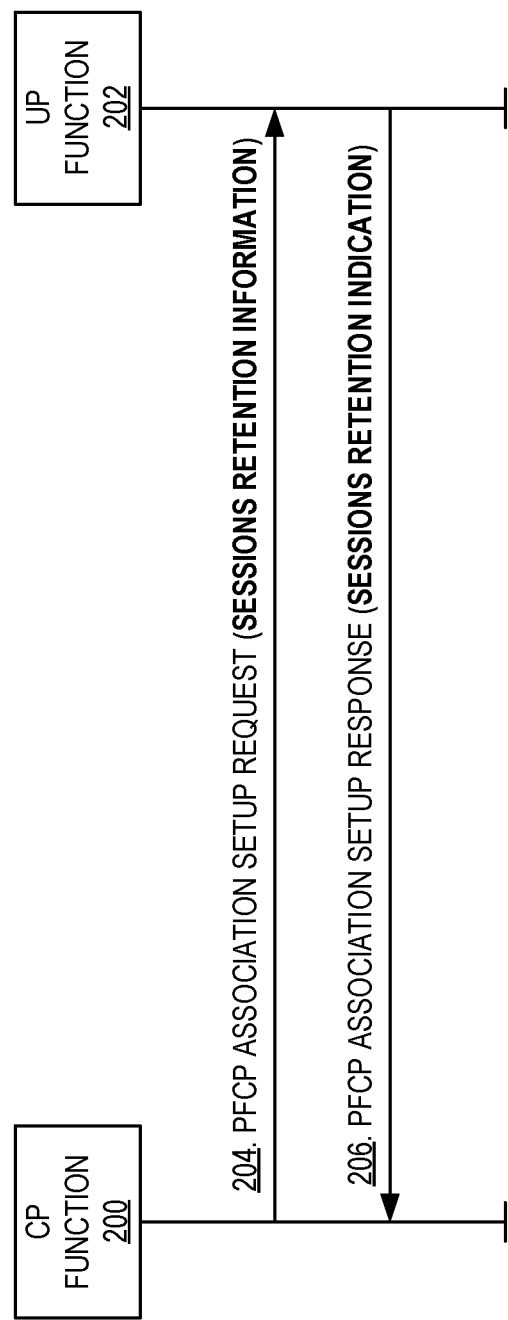
FIG. 2 illustrates signaling flows between PFCP nodes for providing sessions retention information during PFCP association setup.

FIG. 2 illustrates signaling flows between PFCP nodes for providing sessions retention information during PFCP association setup. In some embodiments, the sessions retention information may be provided as part of a PFCP Association Setup Request sent in steps 108a and 108b of FIG. 1. In FIG. 2, a PFCP node comprises a CP function 200, while a PFCP peer node comprises a UP function 202. At step 204, when the CP function 200 initiates the PFCP association setup procedure and sends the PFCP Association Setup Request to the UP function 202, sessions retention information is included within the PFCP Association Setup Request to indicate whether the PFCP sessions associated with the PFCP Association Setup Request need to be retained or not. At step 206, the UP function 202 sends a PFCP Association Setup Response to the CP function 200. The PFCP Association Setup Response includes a sessions retention indication to indicate that the PFCP sessions are successfully retained.

In some embodiments, the sessions retention information indicates that all of the PFCP sessions associated with the PFCP Association Setup Request should be retained. Some embodiments may provide that the sessions retention information comprises a list of IP addresses corresponding to a subset of the PFCP entities to be retained.

The information elements that constitute a PFCP Association Setup Request according to some embodiments are shown below in Table 3.

TABLE 3

Information Elements in a PFCP Association Setup Request

| Information elements | P | Condition/Comment | IE Type |
|---|---|---|---|
| PFCP Sessions retention information | O | Indicating whether all or part of the PFCP sessions need to be retained. If part of the PFCP sessions need to be retained, additional information of the IP addresses representing the PFCP entities is included. | PFCP Sessions retention information |

FIG. 3

Figure 3:
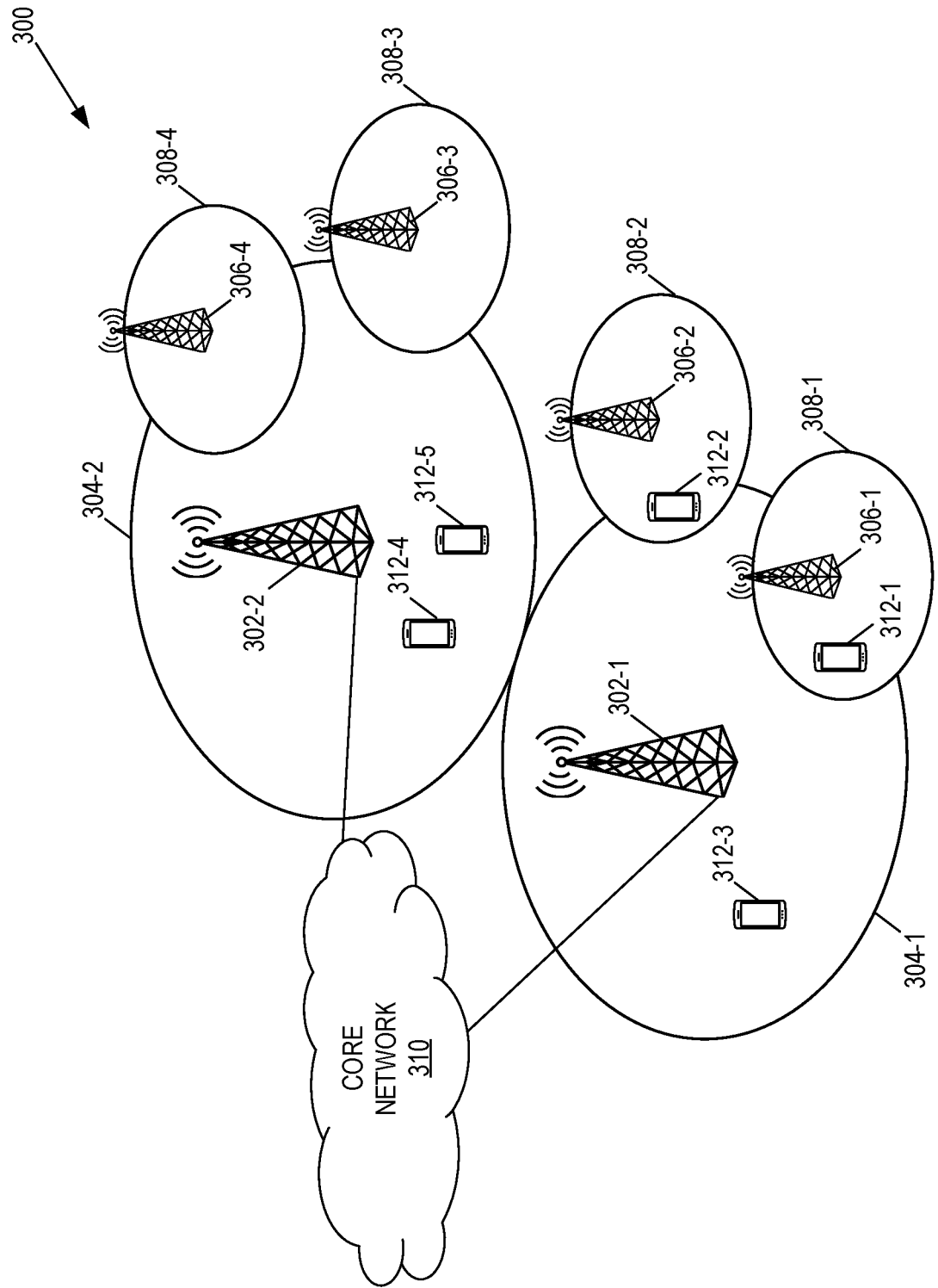
FIG. 3 illustrates one example of a cellular communications network according to some embodiments of the present disclosure.

FIG. 3 illustrates one example of a cellular communications system 300 in which embodiments of the present disclosure may be implemented. In the embodiments described herein, the cellular communications system 300 is 5G System (5GS) including a 5G radio access network (e.g., a NR radio access network) and a 5G Core Network (5GC); however, the present disclosure is not limited thereto. In this example, the RAN includes base stations 302-1 and 302-2, which in 5G NR are referred to as gNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes User Equipment (UEs), but the present disclosure is not limited thereto.

FIG. 4

Figure 4:
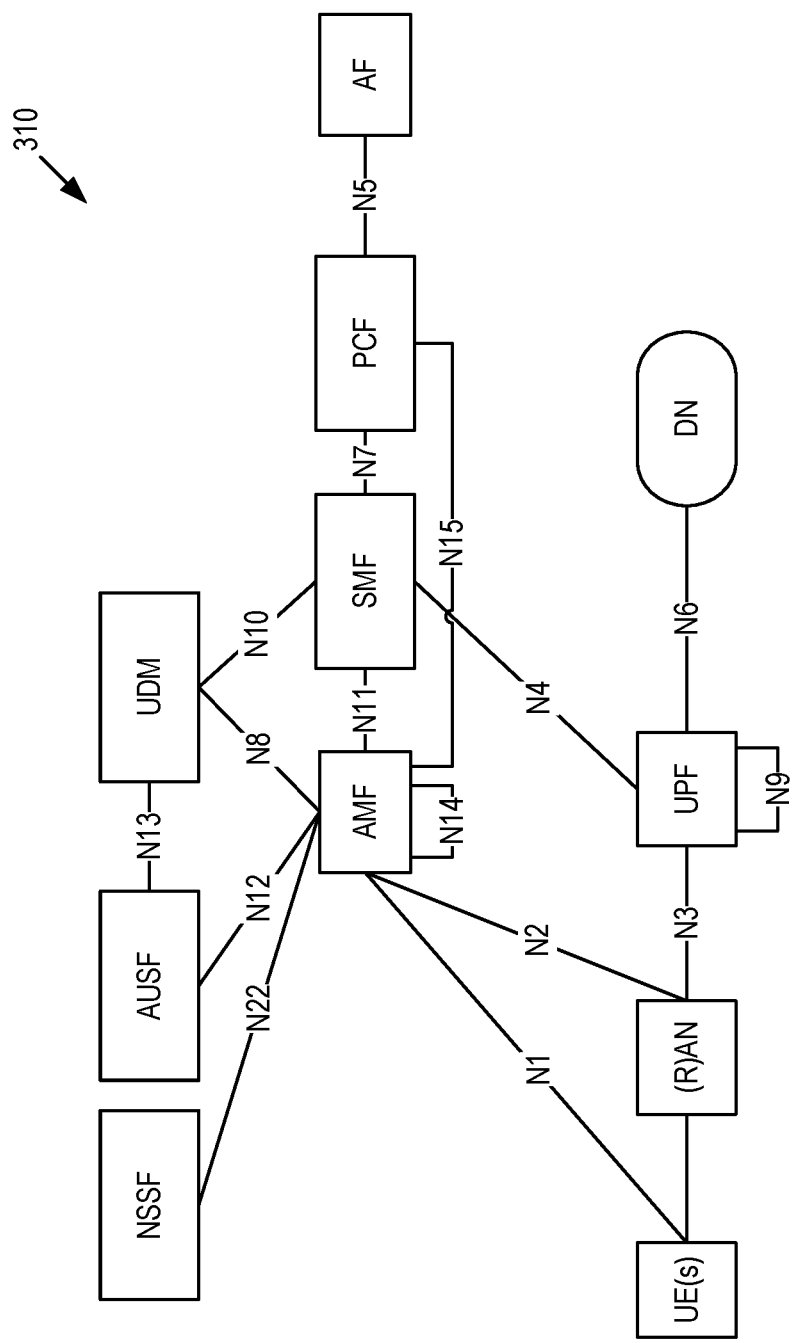
FIG. 4 illustrates a wireless communication system represented as a 5G network architecture composed of core Network Functions (NFs), where interaction between any two NFs is represented by a point-to-point reference point/interface.

FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side, the 5G network architecture shown in FIG. 4 comprises a plurality of UEs connected to either a Radio Access Network (RAN) or an Access Network (AN) as well as an Access and Mobility Management Function (AMF). Typically, the (R)AN comprises base stations, e.g. such as evolved Node Bs (eNBs) or NR base stations (gNBs) or similar. Seen from the core network side, the 5G core NFs shown in FIG. 4 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 4, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allows independent evolution and scaling. Other control plane functions like the PCF and AUSF can be separated as shown in FIG. 4. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 5

Figure 5:
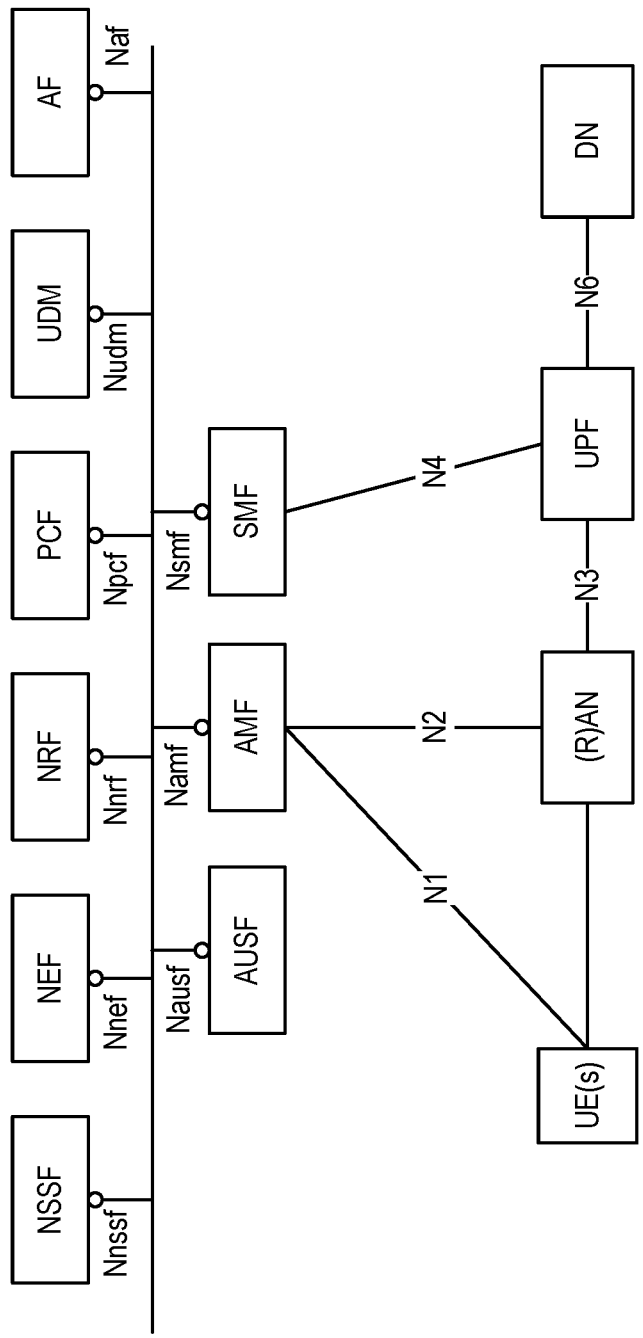
FIG. 5 illustrates a 5G network architecture using service-based interfaces between the NFs in the control plane, instead of the point-to-point reference points/interfaces used in the 5G network architecture of FIG. 4.

FIG. 5 illustrates a 5G network architecture using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s), etc. that an NF provides to other authorized NFs can be exposed to the authorized NFs through the service-based interface. In FIG. 5, the service based interfaces are indicated by the letter "N" followed by the name of the NF, e.g. Namf for the service based interface of the AMF and Nsmf for the service based interface of the SMF etc. The Network Exposure Function (NEF) and the Network Function (NF) Repository Function (NRF) in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE using multiple access technologies is still basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

FIG. 6

Figure 6:
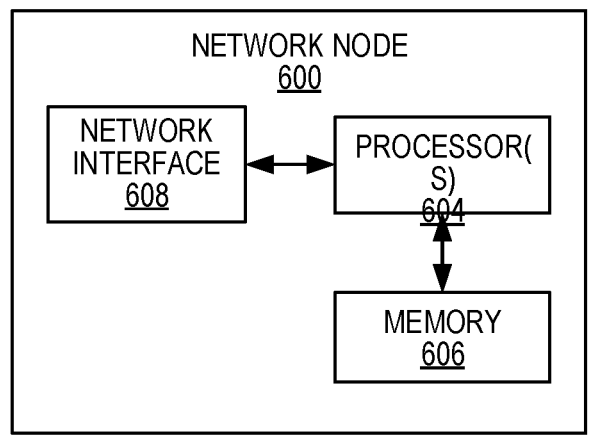
FIG. 6 is a schematic block diagram of a network node according to some embodiments of the present disclosure.

FIG. 6 is a schematic block diagram of a network node 600 according to some embodiments of the present disclosure. The network node 600 may be, for example, a network node that implements all or part of the functionality of a PFCP node described herein, such as the CP function 100 and the UP function 102 of FIG. 1 and the CP function 200 and the UP function 202 of FIG. 2. As illustrated, the network node 600 includes one or more processor(s) 604 (e.g., Central Processing Units (CPUs), Application Specific Integrated Circuits (ASICs), Field Programmable Gate Arrays (FPGAs), and/or the like), a memory 606, and a network interface 608. The one or more processor(s) 604 are also referred to herein as processing circuitry. The one or more processors 604 operate to provide one or more function(s) of a network node 600 as described herein (e.g., one or more functions of a PFCP node described herein, e.g., with respect to FIGS. 5 and 6). In some embodiments, the function(s) are implemented in software that is stored, e.g., in the memory 606 and executed by the one or more processor(s) 604.

FIG. 7

Figure 7:
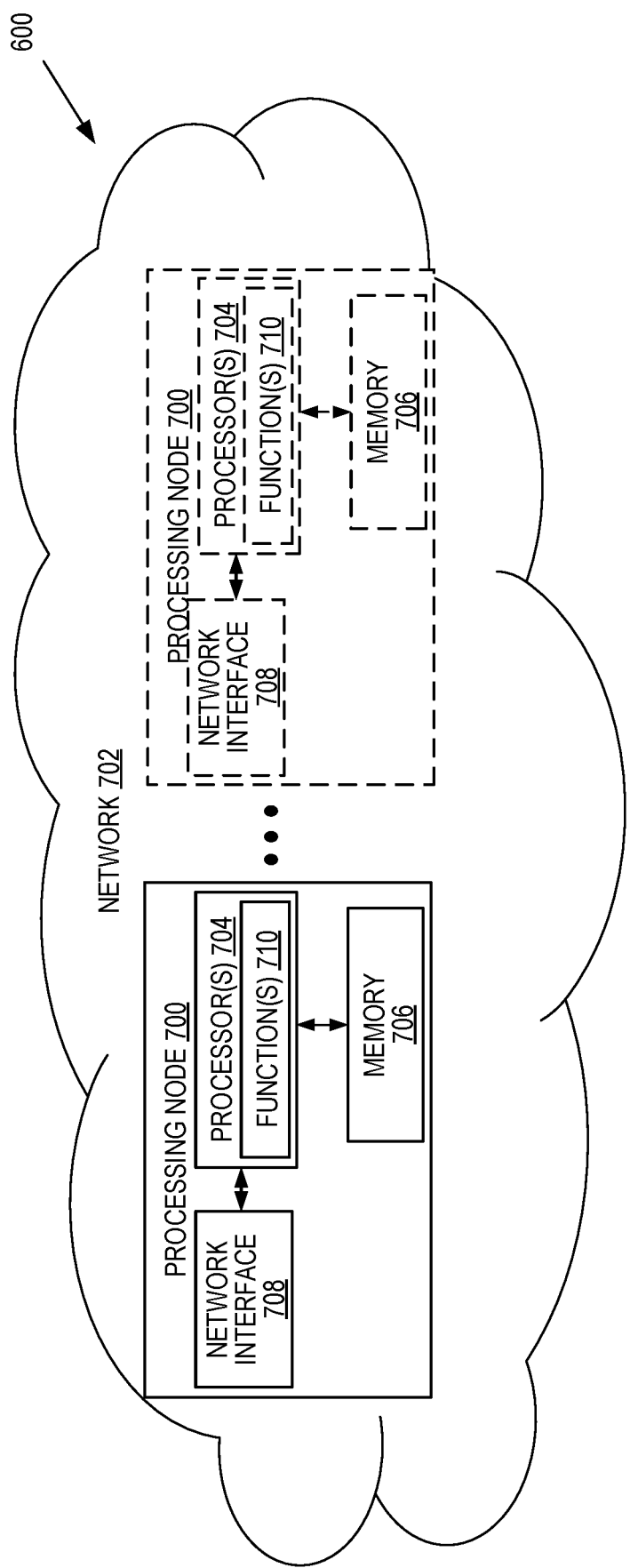
FIG. 7 is a schematic block diagram that illustrates a virtualized embodiment of the network node of FIG. 6 according to some embodiments of the present disclosure.

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures. Optional features are represented by dashed boxes.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing node(s) 700 coupled to or included as part of a network(s) 702. Each processing node 700 includes one or more processor(s) 704 (e.g., CPUs, ASICs, FPGAs, and/or the like), a memory 706, and a network interface 708.

In this example, function(s) 710 of the network node 600 described herein (e.g., one or more functions of a PFCP node described herein, e.g., with respect to FIGS. 5 and 6) are implemented at the one or more processing node(s) 700. In some particular embodiments, some or all of the function(s) 710 of the network node 600 described herein are implemented as virtual components executed by one or more virtual machine(s) implemented in a virtual environment(s) hosted by the processing node(s) 700.

In some embodiments, a computer program including instructions which, when executed by at least one processor, causes the at least one processor to carry out the functionality of network node 600 or a node (e.g., a processing node 700) implementing one or more of the function(s) 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 8

Figure 8:
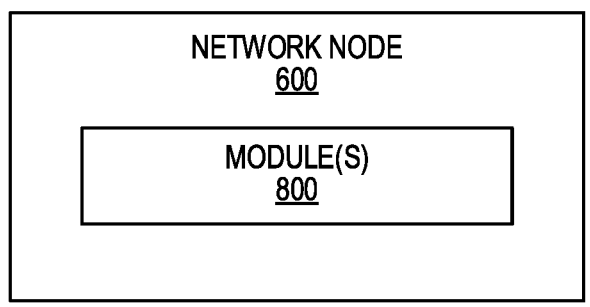
FIG. 8 is a schematic block diagram of the network node of FIG. 6 according to some other embodiments of the present disclosure.

FIG. 8 is a schematic block diagram of the network node 600 according to some other embodiments of the present disclosure. The network node 600 includes one or more module(s) 800, each of which is implemented in software. The module(s) 800 provide the functionality of the network node 600 described herein (e.g., one or more functions of a PFCP node described herein, e.g., with respect to FIGS. 5 and 6). This discussion is equally applicable to the processing node(s) 700 of FIG. 7 where the module(s) 800 may be implemented at one of the processing node(s) 700 or distributed across multiple processing node(s) 700.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some Embodiments

While not being limited thereto, some example embodiments of the present disclosure are provided below.

Embodiment 1: A method performed by a Packet Forwarding Control Protocol (PFCP) node for providing an enhanced PFCP association procedure for session restoration, comprising:
 deleting (106*a*; 106*b*) one or more PFCP sessions of the PFCP node that are associated with a failed PFCP entity or with a failed PFCP path; and
 sending (108*a*; 108*b*), to a PFCP peer node, a node level message to request that the PFCP peer node delete a corresponding one or more PFCP sessions of the PFCP peer node that are associated with the failed PFCP entity or with the failed PFCP path, wherein the node level message comprises an indication of the corresponding one or more PFCP sessions.

Embodiment 2: The method of embodiment 1, further comprising, prior to deleting the one or more PFCP sessions, sending (104), to the PFCP peer node, a PFCP Association Setup Request to initiate a PFCP association setup procedure.

Embodiment 3: The method of any one of embodiments 1 and 2, wherein:
 the PFCP node comprises a control plane (CP) function; and
 the PFCP peer node comprises a user plane (UP) function.

Embodiment 4: The method of any one of embodiments 1 and 2, wherein:
 the PFCP node comprises a UP function; and
 the PFCP peer node comprises a CP function.

Embodiment 5: The method of embodiment 1, wherein:
 the PFCP node comprises a CP function;
 the PFCP peer node comprises a UP function;
 the node level message comprises a PFCP Association Setup Request that comprises sessions retention information to indicate whether PFCP sessions associated with the PFCP Association Setup Request should be retained; and
 the method further comprises receiving (206), by the PFCP node from the PFCP peer node, a PFCP Association Setup Response comprising a sessions retention indication to indicate that the PFCP sessions associated with the PFCP Association Setup Request are successfully retained.

Embodiment 6: The method of embodiment 5, wherein the sessions retention information indicates that all of the PFCP sessions associated with the PFCP Association Setup Request should be retained.

Embodiment 7: The method of embodiment 5, wherein the sessions retention information comprises a list of IP addresses corresponding to a subset of the PFCP entities to be retained.

Embodiment 8: The method of any one of claims 1 to 4, wherein the indication of the corresponding one or more PFCP session comprises a "PFCP Sessions to be deleted information" element.

Embodiment 9: The method of any one of embodiments 1 to 4, wherein the node level message comprises one of a PFCP Association Update Request, a PFCP Session Set Deletion Request, or a custom message.

Embodiment 10: The method of any one of embodiments 1 to 4, further comprising receiving (112*a*; 112*b*), by the PFCP node from the PFCP peer node, a response message confirming deletion of the corresponding one or more PFCP sessions of the PFCP peer node.

Embodiment 11: A core network entity adapted to perform the method of any of embodiments 1 to 10.

Embodiment 12: A core network entity configured to perform the method of any of embodiments 1 to 10.

Embodiment 13: A network node for implementing a core network entity, the network node comprising:
 a network interface; and
 processing circuitry associated with the network interface, the processing circuitry adapted to cause the network node to implement the core network entity, wherein the core network entity is adapted to perform the method of any of embodiments 1 to 10.

Embodiment 14: A network node for implementing a core network entity, the network node comprising:
 a network interface; and
 processing circuitry associated with the network interface, the processing circuitry configured to cause the network node to implement the core network entity, wherein the core network entity is configured to perform the method of any of embodiments 1 to 10.

Embodiment 15: A method performed by a Packet Forwarding Control Protocol (PFCP) node comprising a control plane (CP) function for providing PFCP sessions retention information, the method comprising:
 sending (204), to a PFCP peer node comprising a user plane (UP) function, a PFCP Association Setup Request to initiate a PFCP association setup procedure, wherein the PFCP Association Setup Request comprises sessions retention information to indicate whether PFCP sessions associated with the PFCP Association Setup Request should be retained; and receiving (206), by the PFCP node from the PFCP peer node, a PFCP Association Setup Response comprising a sessions retention indication to indicate that the PFCP sessions associated with the PFCP Association Setup Request are successfully retained.

Embodiment 16: The method of embodiment 15, wherein the sessions retention information indicates that all of the PFCP sessions associated with the PFCP Association Setup Request should be retained.

Embodiment 17: The method of embodiment 15, wherein the sessions retention information comprises a list of IP addresses corresponding to a subset of the PFCP entities to be retained.

Embodiment 18: A core network entity adapted to perform the method of any one of embodiments 15 to 17.

Embodiment 19: A core network entity configured to perform the method of any one of embodiments 15 to 17.

Embodiment 20: A network node for implementing a core network entity, the network node comprising:
a network interface; and
processing circuitry associated with the network interface, the processing circuitry adapted to cause the network node to implement the core network entity, wherein the core network entity is adapted to perform the method of any one of embodiments 15 to 17.

Embodiment 21: A network node for implementing a core network entity, the network node comprising:
a network interface; and
processing circuitry associated with the network interface, the processing circuitry configured to cause the network node to implement the core network entity, wherein the core network entity is configured to perform the method of any one of embodiments 15 to 17.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC 5G Core Network
5GS 5G System
AF Application Function
AMF Access and Mobility Function
AN Access Network
AUSF Authentication Server Function
CP Control Plane
DN Data Network
eNB Enhanced/Evolved Node B
F-TEID Fully Qualified Tunnel Endpoint Identifier
gNB New Radio Base Station
gNB-DU gNB Distributed Unit
HSS Home Subscriber Server
IoT Internet of Things
IP Internet Protocol
LTE Long Term Evolution
MME Mobility Management Entity
MPAS Multiple PFCP Associations to the SMFs in an SMF Set
MTC Machine Type Communication
NEF Network Exposure Function
NF Network Function
NR New Radio
NRF NF Repository Function
NSSF Network Slice Selection Function
PCF Policy Control Function
PFCP Packet Forwarding Control Protocol
P-GW Packet Data Network Gateway
QoS Quality of Service
RAN Radio Access Network
SCEF Service Capability Exposure Function
SMF Session Management Function
SSET SMF Set
TS Technical Specification
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

The invention claimed is:

1. A method performed by a Packet Forwarding Control Protocol (PFCP) node for providing an enhanced PFCP association procedure for session restoration, comprising:
sending, to a PFCP peer node, a PFCP Association Setup Request to negotiate support of session synchronization;
deleting PFCP sessions in the PFCP node that are associated with one or more failed PFCP entities in the same PFCP node or with a failed PFCP path; and
sending, to a PFCP peer node, a node level message to request that the PFCP peer node delete a corresponding one or more PFCP sessions of the PFCP peer node that are associated with the failed PFCP entity or with the failed PFCP path, wherein the node level message comprises an indication of the corresponding one or more PFCP sessions.

2. The method of claim 1, wherein:
the PFCP node comprises a control plane (CP) function; and
the PFCP peer node comprises a user plane (UP) function.

3. The method of claim 1, wherein:
the PFCP node comprises a UP function; and
the PFCP peer node comprises a CP function.

4. The method of claim 1, wherein:
the PFCP node comprises a CP function;
the PFCP peer node comprises a UP function;
the node level message comprises a PFCP Association Setup Request that comprises sessions retention information to indicate whether PFCP sessions associated with the PFCP Association Setup Request should be retained; and
the method further comprises receiving, by the PFCP node from the PFCP peer node, a PFCP Association Setup Response comprising a sessions retention indication to indicate that the PFCP sessions associated with the PFCP Association Setup Request are successfully retained.

5. The method of claim 4, wherein the sessions retention information indicates that all of the PFCP sessions associated with the PFCP Association Setup Request should be retained.

6. The method of claim 4, wherein the sessions retention information comprises a list of IP addresses corresponding to a subset of the PFCP entities to be retained.

7. The method of claim 1, wherein the indication of the corresponding one or more PFCP session comprises a "PFCP Sessions to be deleted information" element.

8. The method of claim 1, wherein the node level message comprises one of a PFCP Association Update Request, a PFCP Session Set Deletion Request, or a custom message.

9. The method of claim 1, further comprising receiving, by the PFCP node from the PFCP peer node, a response message confirming deletion of the corresponding one or more PFCP sessions of the PFCP peer node.

10. A network node for implementing a core network entity, the network node comprising:
a network interface; and
processing circuitry associated with the network interface, the processing circuitry adapted to cause the network node to implement the core network entity, wherein the core network entity is adapted to:
send, to a Packet Forwarding Control Protocol (PFCP) peer node, a PFCP Association Setup Request to negotiate support of session synchronization;
delete PFCP sessions in the PFCP node that are associated with one or more failed PFCP entities in the same PFCP node or with a failed PFCP path; and
send, to a PFCP peer node, a node level message to request that the PFCP peer node delete a corresponding one or more PFCP sessions of the PFCP peer node that are associated with the failed PFCP entity or with the failed PFCP path, wherein the node level message comprises an indication of the corresponding one or more PFCP sessions.

11. A method performed by a Packet Forwarding Control Protocol (PFCP) node comprising a control plane (CP) function for providing PFCP sessions retention information, the method comprising:
sending, to a PFCP peer node comprising a user plane (UP) function, a PFCP Association Setup Request to initiate a PFCP association setup procedure, wherein the PFCP Association Setup Request comprises sessions retention information to indicate whether PFCP sessions associated with the PFCP Association Setup Request should be retained; and
receiving, by the PFCP node from the PFCP peer node, a PFCP Association Setup Response comprising a sessions retention indication to indicate that the PFCP sessions associated with the PFCP Association Setup Request are successfully retained.

12. The method of claim 11, wherein the sessions retention information indicates that all of the PFCP sessions associated with the PFCP Association Setup Request should be retained.

13. The method of claim 11, wherein the sessions retention information comprises a list of IP addresses corresponding to a subset of the PFCP entities to be retained.

14. A network node for implementing a core network entity, the network node comprising:
a network interface; and
processing circuitry associated with the network interface, the processing circuitry adapted to cause the network node to implement the core network entity, wherein the core network entity is adapted to:
send, to a Packet Forwarding Control Protocol (PFCP) peer node comprising a user plane (UP) function, a PFCP Association Setup Request to initiate a PFCP association setup procedure, wherein the PFCP Association Setup Request comprises sessions retention information to indicate whether PFCP sessions associated with the PFCP Association Setup Request should be retained; and
receive, by the PFCP node from the PFCP peer node, a PFCP Association Setup Response comprising a sessions retention indication to indicate that the PFCP sessions associated with the PFCP Association Setup Request are successfully retained.

* * * * *